United States Patent
Mor et al.

(10) Patent No.: US 6,963,537 B2
(45) Date of Patent: Nov. 8, 2005

(54) RESOURCE RESERVATION IN A RING NETWORK

(75) Inventors: Gal Mor, Rishon Lezion (IL); Ron Grinfeld, Ramat Gan (IL)

(73) Assignee: Corrigent Systems Ltd., Tel Aviv (IL)

( * ) Notice: Subject to any disclaimer, the term of this patent is extended or adjusted under 35 U.S.C. 154(b) by 767 days.

(21) Appl. No.: 09/794,898

(22) Filed: Feb. 26, 2001

(65) Prior Publication Data
US 2002/0018481 A1 Feb. 14, 2002

Related U.S. Application Data

(60) Provisional application No. 60/222,698, filed on Aug. 2, 2000, and provisional application No. 60/221,037, filed on Jul. 27, 2000.

(51) Int. Cl.$^7$ .............................................. H04L 12/26
(52) U.S. Cl. ..................................................... 370/232
(58) Field of Search ............................... 370/254, 258, 370/255, 351, 400–406, 221–228, 230–235, 236, 237–238.1, 395.21, 395.37–395.41

(56) References Cited

U.S. PATENT DOCUMENTS

| | | | |
|---|---|---|---|
| 5,461,611 A | | 10/1995 | Drake et al. |
| 5,581,703 A | | 12/1996 | Baugher et al. |
| 5,706,516 A | | 1/1998 | Chang et al. |
| 6,021,263 A | * | 2/2000 | Kujoory et al. ............. 709/232 |
| 6,262,976 B1 | | 7/2001 | McNamara |
| 6,314,110 B1 | | 11/2001 | Chin et al. |
| 6,339,488 B1 | | 1/2002 | Beshai et al. |
| 6,400,681 B1 | * | 6/2002 | Bertin et al. ................. 370/218 |
| 6,584,535 B1 | * | 6/2003 | Ouellet et al. .............. 710/305 |
| 6,639,893 B1 | | 10/2003 | Chikenji et al. |
| 6,639,896 B1 | | 10/2003 | Goode et al. |
| 6,647,008 B1 | * | 11/2003 | Galand et al. .............. 370/389 |

OTHER PUBLICATIONS

Braden. R., "Resource ReSerVation Protocol", RFC 2205, Sep. 1997, pp. 1–91.

Moy, J., "OSPF Version 2", RFC 1583, Mar. 1994, pp. 1–215.

(Continued)

*Primary Examiner*—Chi Pham
*Assistant Examiner*—Thai Hoang
(74) *Attorney, Agent, or Firm*—Darby & Darby

(57) ABSTRACT

A method for routing a data flow from a source node to a destination node among a plurality of nodes mutually linked in a ring by segments of a communication network, configured so that the data flow can traverse the ring in either of first and second, mutually-opposing directions of communication. The method includes maintaining at each of the nodes a record of respective levels of use of a network resource on the segments in the ring for both the first and second directions of communication. Responsive to the respective levels of use, one of the directions is selected at the source node, in which to route the data flow to the destination node. A notification is sent from the source node to the other nodes in the ring of an additional allocation of the resource required by the source node in order to convey the data flow to the destination node in the selected direction on the segments in the ring. The record of the levels of use of the resource at each of the nodes is updated, responsive to the notification from the source node.

22 Claims, 2 Drawing Sheets

OTHER PUBLICATIONS

Plummer, D., "An Ethernet Address Resolution Protocol", RFC 826, Nov. 1982, pp. 1-9.

Finlayson, R. et al., "A Reverse Address Resolution Protocol", RFC 903, Jun. 1984, pp. 1-5.

Tsiang, D. et al., "The Cisco SRP MAC Layer Protocol", RFC 2892, Aug. 2000, pp. 1-52.

Yavatkar, R., et al., "Subnet Bandwidth Manager", RFC 2814, May 2000, pp. 1-60.

Malkin, G., "RIP Version 2", RFC 2453, Nov. 1998, pp. 1-39.

Moy,J., "OSPF Version 2", RFC 2328, Apr. 1998, pp. 1-244.

Ethernet Technologies, "Ethernet and IEEE 802.3", http://www.cisco.com/univercd/cc/td/doc/cisintwk/ito_doc/ethernet.htm, Jun. 1999, pp. 1-21.

* cited by examiner

RESOURCE RESERVATION IN A RING NETWORK

CROSS-REFERENCE TO RELATED APPLICATION

This application claims priority of U.S. Provisional Application No. 60/221,037, filed Jul. 27, 2000 and U.S. Provisional Application No. 60/222,698, filed Aug. 2, 2000.

FIELD OF THE INVENTION

The present invention relates generally to communication networks, and specifically to methods and systems for efficient allocation of resources for data flow in such networks.

BACKGROUND OF THE INVENTION

Network ring topologies are gaining in popularity, particularly in Internet Protocol (IP) networks. Such networks enable carriers to offer large bandwidth to users in a cost-effective manner. In order to gain these benefits, however, IP needs appropriate support at the Media Access Control (MAC—protocol layer 2) level, to provide functions such as load balancing, protection and clock synchronization.

One solution that has been proposed to meet these needs is the Spatial Reuse Protocol (SRP), which is described by Tsiang et al., in Request for Comments (RFC) 2892 of the Internet Engineering Task Force (IETF). This document, which is available at www.ietf.org/rfc.html, is incorporated herein by reference. SRP relates to the ring network as two overlapping local area networks (LANs), identified arbitrarily as an inner ring and an outer ring. In one of the rings, communication flows clockwise, while in the other it flows counterclockwise. Each node in the ring can communicate directly with all other nodes through either of the rings, using the appropriate MAC addresses of the nodes. Spatial reuse enables different nodes to use different, non-overlapping spans of the same ring simultaneously (unlike earlier ring protocols), thus increasing the overall aggregate bandwidth that is available. SRP allows nodes to choose whether to route their packets on the inner or the outer ring, but it does not provide any method for nodes to use in deciding which ring to choose.

SRP also defines a mechanism to be used by nodes on the ring in learning the ring topology. In the topology discovery phase of network start-up, described in section 4.6 of RFC 2892, each node can send out topology packets on one or both rings. The packet hops around the ring from node to node. Each node appends to the packet its own MAC address binding and other information. Eventually the packet comes back to the originating node, which uses the information that has been appended by the other nodes to build a topology map of the ring.

There are routing protocols known in the art for choosing an optimal path from a source node to a destination node through a network when multiple paths are available. These protocols have generally been designed with mesh networks in mind, although they can also be applied to bi-directional ring networks. For example, the Open Shortest First Protocol (OSFP) is a link-state routing protocol that is used to identify and select the path that has the lowest overall "cost." OSFP is described by Moy in RFCs 1583 and 2328 of the IETF, which are available at the above-mentioned Web address and are likewise incorporated herein by reference. This protocol enables a system administrator to assign a cost to each link in the network, so that low-cost links are the ones most likely to be selected for routing. OSFP does not specify, however, how the costs are to be determined. Moreover, since the costs are assigned statically by the system administrator, the protocol does not provide any means or basis for updating the costs automatically, while the network is running, in response to network resource constraints.

After learning the network topology and routing information, the source node must still confirm that it has sufficient resources (such as bandwidth) available to it over a desired route before it can transmit a data flow over the route. The resource requirements for a given transmission depend, inter alia, on the Quality of Service (QoS) level at which the transmission is to be sent. Typically, one of the nodes is appointed to centrally manage resource allocation among all of the nodes in the network or in a given subnet of the network. The manager may be a fixed entity, or it may be chosen from among the nodes using a suitable network management protocol. An example of such a protocol is the Subnet Bandwidth Manager (SBM) protocol, described by Yavatkar et al., in IETF RFC 2814, which is available at the above-mentioned Web address and is incorporated herein by reference. The source node requests the resources that it needs from the manager, typically using another standard protocol, such as the Resource Reservation Protocol (RSVP), described by Braden et al., in IETF RFC 2205, which is likewise available at the above-mentioned Web address and is incorporated herein by reference.

SUMMARY OF THE INVENTION

It is an object of the present invention to provide improved methods and apparatus for managing resource allocation in a network, and particularly in a network that is arranged in a ring topology.

It is a further object of some aspects of the present invention to provide a method for routing data flows that makes optimal use of bandwidth and other resources that are available on different links of a ring network.

In preferred embodiments of the present invention, a communication network comprises a plurality of nodes arranged in a ring topology. The nodes are capable of transmitting data around the ring in either a clockwise or a counterclockwise direction, or in other words, following SRP convention, over an inner or an outer ring within the network. Each of the nodes maintains a load table of resource use on each of the segments of each of the directional rings. Each node can update its load table for a given ring by sending a load update request packet to the next node on the ring. The packet is passed around the ring from node to node. Each node that receives the packet adds its own status information to the packet. The originating node receives the packet back after it has made a complete circuit and analyzes the packet contents to determine current resource use. The node preferably sends the load update request in preparation for making a new resource reservation on the ring. Alternatively, the node may send the request periodically, independent of specific resource reservations, and it preferably also updates its load tables based on resource reservation packets sent by other nodes on the ring, as described below.

Whenever a node needs to request network resources to carry a data flow to another node, it preferably chooses to send the flow on the less heavily loaded of the directional ring. Most preferably, the node first finds the most heavily loaded segment in each of the rings, and then chooses the ring that has the lower level of load on this segment. The node verifies that the desired flow is within its maximum permitted allocation on the chosen ring. If so, the node notes the allocation in its own load table and sends a load update advertisement packet around the ring, to advertise that the allocation has been made. Preferably, before sending this packet, the node sends a lock packet to the other nodes on the ring, to maintain synchronization among the nodes and prevent situations in which two or more nodes attempt to make reservations at once. Each node in turn receives this load update advertising packet, and updates its own load tables accordingly. When the packet returns to the originating node, the transaction is finalized.

Thus, preferred embodiments of the present invention provide a decentralized mechanism for managing resource allocation in a ring network. The two phases of the transaction—using the lock packet followed by the load update advertising packet—ensure that synchronization and consistency are maintained among the nodes. Decentralized resource management is an efficient means for controlling data flow allocations, particularly in ring networks, and is more robust than centralized management protocols, such as SBM, in the face of node failures.

Although preferred embodiments are described herein mainly with reference to controlling bandwidth allocation, the principles of the present invention are similarly applicable to management of other resources and data flow allocations based on these resources. Such resources may include, but are not limited to, processing power used to transmit, receive, encrypt or decrypt data, as well as substantially any other allocable factor that may affect the ability of a network link to convey a data flow between nodes.

There is therefore provided, in accordance with a preferred embodiment of the present invention, a method for routing a data flow from a source node to a destination node among a plurality of nodes mutually linked in a ring by segments of a communication network, configured so that the data flow can traverse the ring in either of first and second, mutually-opposing directions of communication, the method including:

maintaining at each of the nodes a record of respective levels of use of a network resource on the segments in the ring for both the first and second directions of communication;

selecting at the source node, responsive to the respective levels of use, one of the directions in which to route the data flow to the destination node;

sending a notification from the source node to the other nodes in the ring of an additional allocation of the resource required by the source node in order to convey the data flow to the destination node in the selected direction on the segments in the ring; and updating the record of the levels of use of the resource at each of the nodes, responsive to the notification from the source node.

Preferably, the network includes an Internet Protocol (IP) network, and sending the notification includes sending a User Datagram Protocol (UDP) packet over the IP network. Alternatively, sending the notification comprises sending a media access control (MAC) frame over the network. In a preferred embodiment, selecting one of the directions includes determining whether to convey the data flow over an inner or outer data link ring provided by a Spatial Reuse Protocol (SRP).

Preferably, the network resource includes a segment bandwidth. Further preferably, selecting one of the directions includes verifying that a sufficient amount of the network resource is available to carry the data flow on every one of the segments included in a path from the source node to the destination node in the selected direction. Additionally or alternatively, selecting one of the directions includes selecting the direction having the lowest level of load with respect to the resource. Most preferably, selecting the direction includes finding a maximum of the respective levels of use of the resource, taken over all of the segments included in a path from the source node to the destination node in each of the directions, and selecting the direction having the lower maximum level of use.

Preferably, sending the notification includes sending a data packet from node to node in succession around the ring in the selected direction, and receiving the data packet back at the source node after the packet has traversed the ring. Further preferably, receiving the data packet back at the source node includes receiving an account of the allocation of the resource on each of the segments in the ring, and verifying, responsive to the account, that the additional allocation can be made. Additionally or alternatively, sending the data packet includes adding a unique identifier to the packet, and wherein receiving the data packet includes identifying the packet as having been sent by the source node responsive to the identifier.

Further additionally or alternatively, updating the record includes, after receiving the data packet back at the source node, sending an additional data packet from the source node around the ring in the selected direction so as to notify the other nodes that the additional allocation of the resource has been made. Preferably, sending the data packet includes sending a lock packet, so as to prevent the nodes other than the source node from allocating the resource, and sending the additional data packet includes sending an unlock packet, so that the nodes other than the source node can resume allocating the resource after the additional allocation by the source node has been completed.

There is also provided, in accordance with a preferred embodiment of the present invention, a communication network, including:

a plurality of link segments for carrying communication traffic;

a plurality of nodes, mutually connected by the segments in a ring so that the communication traffic can traverse the ring in either of first and second, mutually-opposing directions of communication, wherein each of the nodes is configured to maintain a record of respective levels of use of a network resource on the segments in the ring for both the first and second directions of communication, such that in order to route a data flow from a source node to a destination node among the plurality of nodes in the ring, the source node selects one of the directions in which to route the data flow to the destination node responsive to the recorded levels of use, and sends a notification to the other nodes in the ring of an additional allocation of the resource required by the source node to convey the data flow to the destination node in the selected direction on the segments in the ring, whereupon the record of the levels of use of the resource is updated at each of the nodes responsive to the notification from the source node.

The present invention will be more fully understood from the following detailed description of the preferred embodiments thereof, taken together with the drawings in which:

DETAILED DESCRIPTION OF PREFERRED EMBODIMENTS

Figure 1:
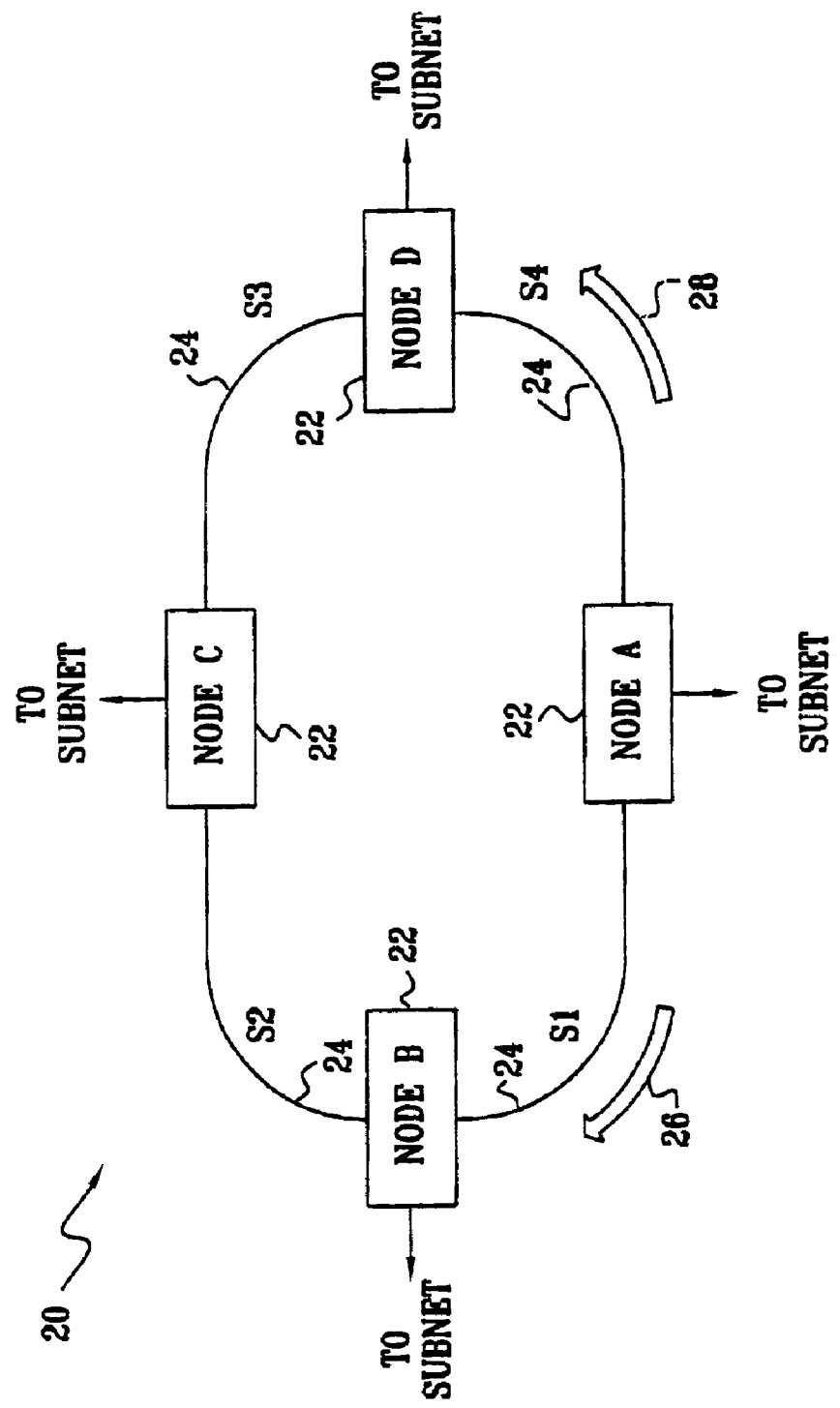
FIG. 1 is a block diagram that schematically illustrates a ring network, in accordance with a preferred embodiment of the present invention.

FIG. 1 is a block diagram that schematically illustrates an IP ring network 20, in accordance with a preferred embodiment of the present invention. Network 20 comprises nodes 22, which are connected by links 24 labeled S1 through S4. Each node can communicate with every other node over either a clockwise ring 26 or a counterclockwise ring 28 around the ring, indicated respectively by arrows adjacent to node A. Following SRP convention, these two paths are identified respectively as an outer ring and an inner ring, each of which is made up of ring segments corresponding to the physical links between the nodes. Typically, each of the nodes also links the ring to a respective subnet, which may be of substantially any topology known in the art. When node A, for example, receives a data flow from its respective subnet, which is destined for the subnet of node C, node A determines whether to transmit the flow over ring 26 or ring 28, using the method described hereinbelow.

Figure 2:
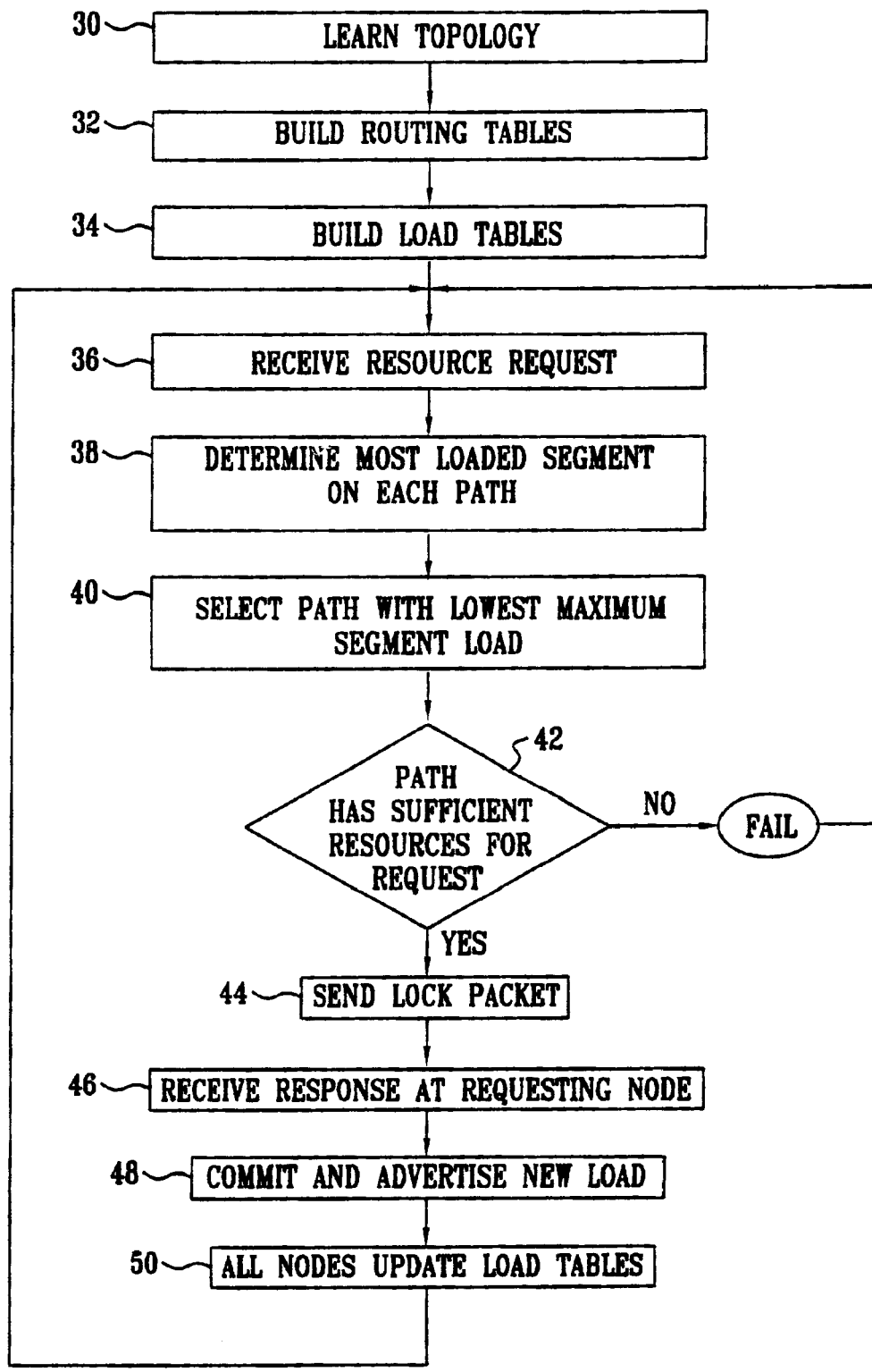
FIG. 2 is a flow chart that schematically illustrates a method for assigning network resources to network nodes, in accordance with a preferred embodiment of the present invention.

FIG. 2 is a flow chart that schematically illustrates a method for assigning resources to nodes 22 and updating resource assignments, in accordance with a preferred embodiment of the present invention. At start-up of the network, each of the nodes learns the topology of ring network 20, at a topology learning step 30. This step is preferably carried out using the mechanism provided for this purpose by SRP, as described in the above-mentioned RFC 2892. The step is preferably repeated periodically in order to track changes in the ring. In addition, the nodes build routing tables for the overall network (including the subnets that are outside the ring network), at a route learning step 32. The routing tables are preferably built using the above-mentioned OSPF protocol, or alternatively using other suitable protocols known in the art, such as the Routing Information Protocol (RIP), described by Malkin in IETF RFC 2453. This RFC document, which is available at www.ietf.org/rfc.html, is incorporated herein by reference. At this stage, nodes 22 also learn forwarding information within ring network 20, relating the MAC addresses of the nodes to their IP addresses, typically using local area network (LAN) protocols known in the art. Examples of such protocols include the Address Resolution Protocol (ARP), described by Plummer in RFC 826, and the Reverse Address Resolution Protocol (RARP), described by Finlayson et al., in RFC 903. These documents, available at the above-mentioned Web address, are also incorporated herein by reference.

In preparation for allocating bandwidth to data flows within ring network 20, nodes 22 build load tables, at a load table building step 34. Each node maintains two tables, one for ring 26 and the other for ring 28. Each table has entries for all of segments 24 in the respective ring, preferably arranged in topological order according to the direction of the ring, with the node maintaining the table at the root. Each entry in the table holds a record of the current load on the respective segment, i.e., the amount of bandwidth and/or other relevant resources that is allocated and/or available for use on the segment.

In order to build the load table for each ring, the nodes send load update request packets around the ring. The load update request packet is passed around the ring, hop-by-hop, from one node to the next. Each of the nodes in turn reads the information in the packet and adds or alters the information as appropriate before passing the packet on to the next node. Preferably, the load update request packer comprises a User Datagram Protocol (UDP/IP) packet, although other transport layer protocols known in the art may also be used. A similar packet format is used by the nodes to make and advertise resource reservations, as described below. The packet preferably includes the following field values:

IP headers:
    Source IP address of the sending node on each hop.
    Destination IP address (unicast address) of the next node on the hop.

UDP headers:
    Source port—arbitrary.
    Destination port—value reserved for this resource assignment method.

UDP payload:
    OPCODE (operation code), indicating the type of message being sent—load update request, or a lock/unlock or load update advertisement, as described below.
    STATUS, enabling each node to confirm or deny a requested transaction (when the packet is sent by a node in preparation for making a resource reservation, as described below). The node will deny the transaction if the information in the packet does not conform to information stored in the node's own tables or when the node cannot find itself listed in the packet. When one of the node enters a STATUS denial, a synchronization process is preferably invoked to resolve the discrepancy in the tables of the different nodes.
    TID (transaction identifier) is a unique number assigned by the originating node of the resource request (node A in the present example). The TID is generated, for example, by applying a random function to an identifying address of the node. It must not be changed by the other nodes as the packet is passed from hop to hop.

The load update request or other packet makes a complete circuit of the ring, until it returns to the originating node. The originating node recognizes that this was the packet that it originally sent out on the basis of the TID. Use of these TIDs allows multiple transactions to take place on network 20 simultaneously without the risk of confusion among the transactions.

In an alternative embodiment, the load update request and other packets used in managing resource allocation comprise Layer 2 (media access control—MAC) frames. MAC protocols that can be used for this purpose include Ethernet-II and IEEE 802.3, for example. Nodes 22 are connected by point-to-point Layer 2 links, as described in the SRP specification. Each node on the ring that receives the Layer 2 frame checks whether the source address is equal to its own address. If not, the node extracts the frame, processes it, and forwards it to the next node. If the source address is equal to the node's own address (indicating that the frame has made a complete circuit of the ring), the node extracts and terminates the frame.

ETHERNET-II frames used in this context preferably comprise the following fields:

Ethernet header:
    Destination-Address: multicast address or a unique address (e.g., zeros).
    Source-Address: the address of the source node.
    Ethernet-Type: a unique value dedicated to the resource allocation protocol (a single value for all types of messages).

Ethernet payload:
   OPCODE.
   STATUS.
   TID.
FCS (Frame Check Sequence).

Alternatively, IEEE802.3 frames for this purpose preferably comprise the following fields:
Header:
   Destination-Address: multicast address or a unique address (e.g., zeros).
   Source-Address: the address of the source node.
   Length: length of the frame.
   DSAP/SSAP (Source Service Access Point/Destination Service Access Point): a unique value dedicated to the resource allocation protocol (a single value for all types of messages).
Payload:
   OPCODE.
   STATUS.
   TID.
FCS (Frame Check Sequence).

A resource request step 36 is invoked whenever one of nodes 22 receives a request to allocate resources to a data flow coming from its respective subnet. A corresponding resource release step (not shown) is invoked when a data flow terminates, so that the resources that were allocated for the data flow can be torn down and returned to general use. For the sake of example, it will be assumed that node A receives the data flow allocation request, and that the destination address of the data flow is in the subnet of node C. Node A checks its load table to find the most heavily loaded segment on each of rings 26 and 28 between node A and node C, at a load checking step 38. (Optionally, node A may send a load update request packet at this stage, as well, in order to update its load tables before making the allocation.) For example, it may be in this case that segment S2 is the most heavily loaded between node A and node C on ring 26, while segment S4 is the most heavily loaded between node A and node C on ring 28. Because of the spatial reuse properties of SRP, node A is indifferent (with respect to this particular data flow) to the load levels on segments S3 and S4 of ring 26 and on segments S1 and S2 of ring 28.

Node A chooses to send the data flow over ring 26 or ring 28 depending on which of the respective segments S2 and S4 is the less heavily loaded, at a path selection step 40. The purpose of this step is to maintain, insofar as possible, a balance between the maximum segment loads on the two rings. Before requesting bandwidth for the data flow, however, node A verifies that there is sufficient additional bandwidth available to it on the selected segment and path, at a verification step 42. Assuming ring 26 is selected, it is possible that segment S2 does not have sufficient additional capacity free to carry the desired data flow. It also may be that the data flow will put node A over a pre-allocated resource budget that is available to it on ring 26. In such cases, node A cannot pass on the data flow through network 20 and must return an error message to the originator of the data flow in its subnet.

Having chosen the ring over which to send the data flow, and ascertained that there are sufficient resources available there, node A must now reserve the bandwidth that it requires. Preferably, in order to maintain synchronization between the nodes on the same ring, node A sends a lock packet (identified by its OPCODE) around the ring, at a locking step 44. The lock packet informs all of the nodes that a reservation is about to be made. No additional reservation can be requested until an unlock packet is received (identified by its OPCODE) or sufficient time has passed to invoke a lock-timeout.

The lock packet makes a complete circuit of ring 26, returning to node A at a response step 46. If node A does not receive the lock packet back within a predetermined timeout period, it preferably resends the packet. If the packet still does not return after multiple resends, node A typically invokes the synchronization or topology learning process mentioned above.

When the lock packet returns to node A indicating that none of the other nodes has denied the request, node A is able to commit the bandwidth needed to carry the requested data flow, at a commitment step 48. (Alternatively, steps 44 and 46 may be omitted, and node A can go directly to step 48 when it determines that there are sufficient resources available on the chosen ring.) Accordingly, node A sends another packet around ring 26, hop-by-hop, to advertise the new load it is placing on the ring. This packet is also preferably a UDP/IP packet of the form described above, but with an OPCODE indicating that it is a load update advertisement packet, rather than a load update request, as noted above. If node A sent a lock packet at step 44, the update advertisement packet also serves as an unlock packet, allowing the other nodes to make further resource reservations. The advertisement packet preferably carries in its payload the entire updated load table for the ring, including the new bandwidth commitment As the advertisement packet is passed around the ring, each of the nodes in turn records that the transaction announced by the preceding load update request packet has taken place, and updates its own load tables accordingly, at an update step 50. When this packet returns to the originating node, that node is able to finalize the transaction and to convey the data flow using the newly-allocated bandwidth.

Although preferred embodiments are described hereinabove with reference to a ring topology and to certain specific protocols, such as SRP and IP, used in conjunction with this topology, the principles of the present invention may similarly be applied, mutatis mutandis, to networks of other topologies, such as mesh topologies, and using other protocols. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for routing a data flow from a source node to a destination node among a plurality of nodes mutually linked in a ring by segments of a communication network, configured so that the data flow can traverse the ring in either of first and second, mutually-opposing directions of communication, the method comprising:

maintaining at each of the nodes a record of respective levels of use of a network resource on the segments in the ring for both the first and second directions of communication;

selecting at the source node, responsive to the respective levels of use, one of the directions in which to route the data flow to the destination node;

sending a notification from the source node to the other nodes in the ring of an additional allocation of the resource required by the source node in order to convey the data flow to the destination node in the selected direction on the segments in the ring; and updating the record of the levels of use of the resource at each of the nodes, responsive to the notification from the source node, wherein sending the notification comprises sending a data packet from node to node in succession around the ring in the selected direction, and receiving the data packet back at the source node after the packet has traversed the ring, and wherein updating the record comprises, after receiving the data packet back at the source node, sending an additional data packet from the source node around the ring in the selected direction so as to notify the other nodes that the additional allocation of the resource has been made, and wherein sending the data packet comprises sending a lock packet, so as to prevent the nodes other than the source node from allocating the resource, and wherein sending the additional data packet comprises sending an unlock packet, so that the nodes other than the source node can resume allocating the resource after the additional allocation by the source node has been completed.

2. A method according to claim 1, wherein the network comprises an Internet Protocol (IP) network.

3. A method according to claim 2, wherein sending the notification comprises sending a User Datagram Protocol (UDP) packet over the IP network.

4. A method according to claim 1, wherein sending the notification comprises sending a media access control (MAC) frame over the network.

5. A method according to claim 1, wherein selecting one of the directions comprises determining whether to convey the data flow over an inner or outer data link ring provided by a Spatial Reuse Protocol (SRP).

6. A method according to claim 1, wherein the network resource comprises a segment bandwidth.

7. A method according to claim 1, wherein selecting one of the directions comprises verifying that a sufficient amount of the network resource is available to carry the data flow on every one of the segments comprised in a path from the source node to the destination node in the selected direction.

8. A method according to claim 1, wherein selecting one of the directions comprises selecting the direction having the lowest level of load with respect to the resource.

9. A method according to claim 8, wherein selecting the direction comprises finding a maximum of the respective levels of use of the resource, taken over all of the segments comprised in a path from the source node to the destination node in each of the directions, and selecting the direction having the lower maximum level of use.

10. A method according to claim 1, wherein receiving the data packet back at the source node comprises receiving an account of the allocation of the resource on each of the segments in the ring, and verifying, responsive to the account, that the additional allocation can be made.

11. A method according to claim 1, wherein sending the data packet comprises adding a unique identifier to the packet, and wherein receiving the data packet comprises identifying the packet as having been sent by the source node responsive to the identifier.

12. A communication network, comprising:

a plurality of link segments for carrying communication traffic;

a plurality of nodes, mutually connected by the segments in a ring so that the communication traffic can traverse the ring in either of first and second, mutually-opposing directions of communication, wherein each of the nodes is configured to maintain a record of respective levels of use of a network resource on the segments in the ring for both the first and second directions of communication, such that in order to route a data flow from a source node to a destination node among the plurality of nodes in the ring, the source node selects one of the directions in which to route the data flow to the destination node responsive to the recorded levels of use, and sends a notification to the other nodes in the ring of an additional allocation of the resource required by the source node to convey the data flow to the destination node in the selected direction on the segments in the ring, whereupon the record of the levels of use of the resource is updated at each of the nodes responsive to the notification from the source node, and wherein the notification comprises a data packet sent from node to node in succession around the ring in the selected direction, which packet is received back at the source node after it has traversed the ring, and wherein after receiving the data packet back at the source node, the source node is adapted to send an additional data packet around the ring in the selected direction so as to notify the other nodes that the additional allocation of the resource has been made, and wherein the data packet comprises a lock packet, such that upon receipt of the lock packet, the nodes other than the source node are prevented from allocating the resource, and wherein the additional data packet comprises an unlock packet, such that upon receipt of the unlock packet, the nodes other than the source node can resume allocating the resource after the additional allocation by the source node has been completed.

13. A network according to claim 12, wherein the network comprises an Internet Protocol (IP) network.

14. A method according to claim 13, wherein sending the notification comprises a User Datagram Protocol (UDP) packet sent over the IP network.

15. A network according to claim 12, wherein the notification comprises a media access control (MAC) sent over the network.

16. A network according to claim 12, wherein the first and second directions correspond respectively to inner and outer data link rings in the network provided by a Spatial Reuse Protocol (SRP).

17. A network according to claim 12, wherein the network resource comprises a segment bandwidth.

18. A network according to claim 12, wherein in order to select one of the directions, the source node is adapted to verify that a sufficient amount of the network resource is available to carry the data flow on every one of the segments comprised in a path from the source node to the destination node in the selected direction.

19. A network according to claim 12, wherein the source node is adapted to select the direction having the lowest level of load with respect to the resource.

20. A network according to claim 19, wherein the source node is adapted to find a maximum of the respective levels of use of the resource, taken over all of the segments comprised in a path from the source node to the destination node in each of the directions, and to select the direction having the lower maximum level of use.

21. A network according to claim 12, wherein the data packet received back at the source node comprises an account of the allocation of the resource on each of the segments in the ring, and wherein the source node it is adapted to verify, responsive to the account, that the additional allocation can be made.

22. A network according to claim 12, wherein the source node is adapted to add a unique identifier to the packet, and to identify the packet received back at the source node responsive to the identifier as having been sent by the source node.

* * * * *